United States Patent
Oike et al.

[11] Patent Number: 5,485,376
[45] Date of Patent: Jan. 16, 1996

[54] STEERING WHEEL POSTURE CONTROL SYSTEM

[75] Inventors: Mitsuru Oike; Masahiro Kusano; Osamu Sato, all of Kanagawa, Japan

[73] Assignee: Nissan Motor Co., Ltd., Yokohama, Japan

[21] Appl. No.: 866,775

[22] Filed: Mar. 30, 1992

[30] Foreign Application Priority Data

Jun. 14, 1991 [JP] Japan .................... 3-142226
Jun. 14, 1991 [JP] Japan .................... 3-142227

[51] Int. Cl.⁶ .................. G06F 7/70; G06G 7/76
[52] U.S. Cl. ............. 364/424.05; 180/140; 180/143; 180/142; 180/141; 280/91; 280/772; 280/707
[58] Field of Search .......... 384/424.05, 431.07, 384/424.1, 425; 74/493, 878, 866; 192/4 A; 280/775, 707, 91, 772; 340/456; 180/142, 141, 140, 143; 318/434; 414/460

[56] References Cited

U.S. PATENT DOCUMENTS

| | | | |
|---|---|---|---|
| 3,613,925 | 10/1971 | Stum | 414/460 |
| 4,661,752 | 4/1987 | Nishikawa et al. | 318/434 |
| 4,719,981 | 1/1988 | Miyoshi | 180/140 |
| 4,737,915 | 4/1988 | Hosaka | 364/431.07 |
| 4,752,085 | 6/1988 | Yamamoto | 280/775 |
| 4,834,205 | 5/1989 | Mizuno et al. | 180/141 |
| 4,978,137 | 12/1990 | Futami et al. | 280/775 |
| 4,979,114 | 12/1990 | Oshita et al. | 364/424.05 |
| 4,980,668 | 12/1990 | Leigh-Monstevens | 340/456 |
| 5,037,119 | 8/1991 | Takehara et al. | 280/91 |
| 5,101,350 | 3/1992 | Tokoro | 364/424.1 |
| 5,129,494 | 7/1992 | Rolinski et al. | 192/4 A |
| 5,181,592 | 1/1993 | Pattock | 192/4 A |
| 5,207,287 | 5/1993 | Sano et al. | 180/140 |

FOREIGN PATENT DOCUMENTS 58-33569  2/1983  Japan.
61-67660  4/1986  Japan.

OTHER PUBLICATIONS

"Nissan Infiniti Q45", pp. C-15, C-19, Oct. 1989.

Primary Examiner—Kevin J. Teska
Assistant Examiner—Jacques H. Louis-Jacques
Attorney, Agent, or Firm—Lowe, Price, LeBlanc & Becker

[57] ABSTRACT

A system for automatically swinging a steering wheel to a withdrawn position to make it easy for the driver to get on and off a vehicle is made more reliable by employing a park position sensor such as a detent switch for producing a park signal only when a shift lever of an automatic transmission is in a park position. A control unit produces an automatic withdraw command signal to drive a motor to withdraw the steering wheel in response to a driver's operation such as an operation to open a driver's door or an operation to turn an ignition key to a lock position. The control unit produces the automatic withdraw command signal only when the shift lever is in the park position.

19 Claims, 8 Drawing Sheets

FIG. 7

| | | |
|---|---|---|
| AUTOMATIC WITHDRAWAL | 1 | KEY IS EXTRACTED |
| | 2 | DOOR IS OPENED WHILE KEY IS IN KEYHOLE (AT "LOCK") |
| | 3 | KEY IS TURNED FROM "ACC" TO "LOCK" WHILE DOOR IS OPEN |
| AUTOMATIC RETURN | 1 | KEY IS INSERTED |
| | 2 | DOOR IS CLOSED WHILE KEY IS IN KEYHOLE (AT "LOCK") |
| | 3 | KEY IS TURNED FROM "ACC" TO "IGN" |

5,485,376

STEERING WHEEL POSTURE CONTROL SYSTEM

BACKGROUND OF THE INVENTION

The present invention relates to a control system for changing the posture of a steering wheel of a vehicle to make it easier for a driver to get on and off the vehicle.

Japanese Patent Provisional Publication No. 58-33569 discloses a conventional system which automatically withdraws the steering wheel when a driver gets off the vehicle. It is, however, difficult to completely avoid the possibility that the steering wheel is moved during movement of the vehicle or against expectation of the driver. Japanese Patent Provisional Publication No. 61-67660 discloses a similar system.

SUMMARY OF THE INVENTION

It is an object of the present invention to provide a steering wheel position control system which is reliable and accurate According to the present invention, a control system for changing the position of a steering wheel of a vehicle, comprises a drive means for changing the position of the steering wheel in response to a command signal, a sensing means for sensing at least a condition of an automatic transmission of the vehicle, and a controlling means for commanding the drive means to change the position of the steering wheel by producing the command signal to make it easier for the driver of the vehicle to get on and off the vehicle. The controlling means delivers the command signal only when the automatic transmission is in the parking state. Therefore, the control system of the invention can more reliably prevent the automatic operations of the steering wheel when the vehicle is moving even if a vehicle speed sensor is in an abnormal condition, and accurately discriminate situations requiring the automatic withdrawal of the steering wheel.

BRIEF DESCRIPTION OF THE DRAWINGS

FIG. 7 is a table showing conditions of automatic withdrawal and return, used in the control systems of FIGS. 2 and 5.

DETAILED DESCRIPTION OF THE INVENTION

Figure 1:
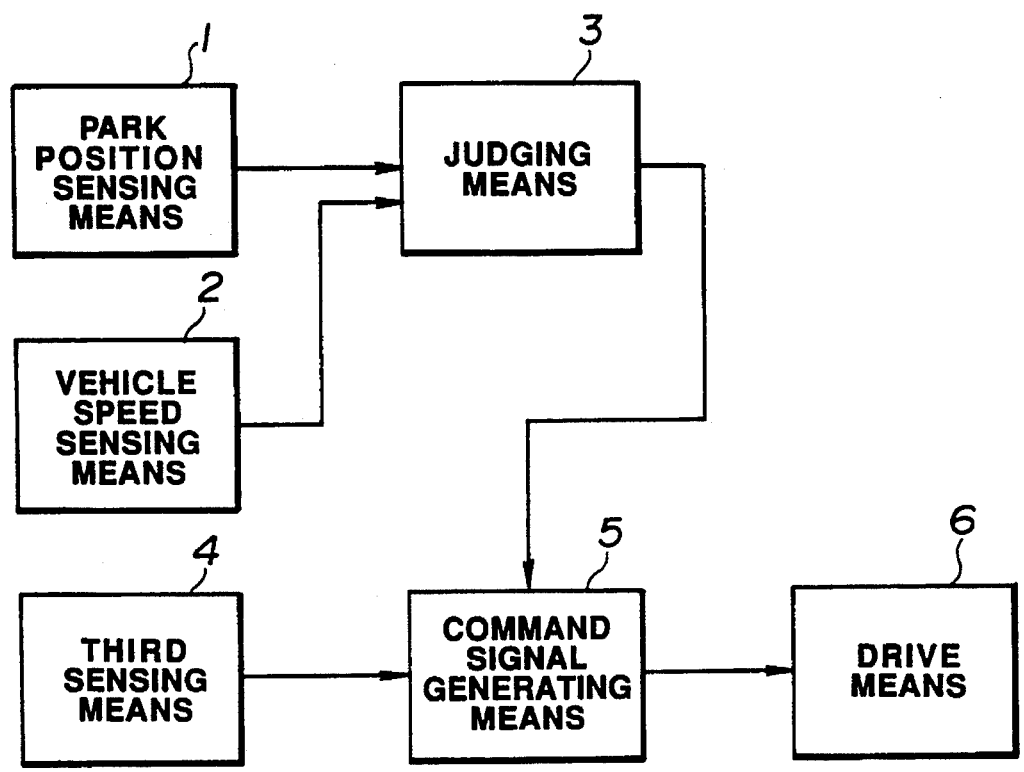
FIG. 1 is a block diagram showing a first embodiment of the present invention.

FIG. 1 shows a first embodiment of the present invention. A control system shown in FIG. 1 is mounted on a vehicle. The control system of the first embodiment comprises a park position sensing means 1 for sensing a condition of an automatic transmission of a vehicle, a means 2 for sensing a vehicle speed, and a third sensing means 4 for sensing one or more vehicle conditions to determine whether a predetermined requirement is satisfied or not. The system further comprises a controlling means which, in this embodiment, comprises a judging means for producing a permission signal to permit automatic movement of a steering wheel only when the automatic transmission is in the parking state, and at the same time the vehicle speed is (equal to or) lower than a predetermined low vehicle speed (10 km/h, for example), and a command signal generating means 5 for producing a command signal to move the steering wheel when the permission signal is present and the predetermined requirement is satisfied. For example, the command signal is produced to withdraw the steering wheel when the driver extracts a vehicle key from a keyhole of a vehicle main switch while the permission signal is present. The command signal is delivered to a drive means 6, which produces mechanical power to move the steering wheel in accordance with the command signal.

Figure 2:
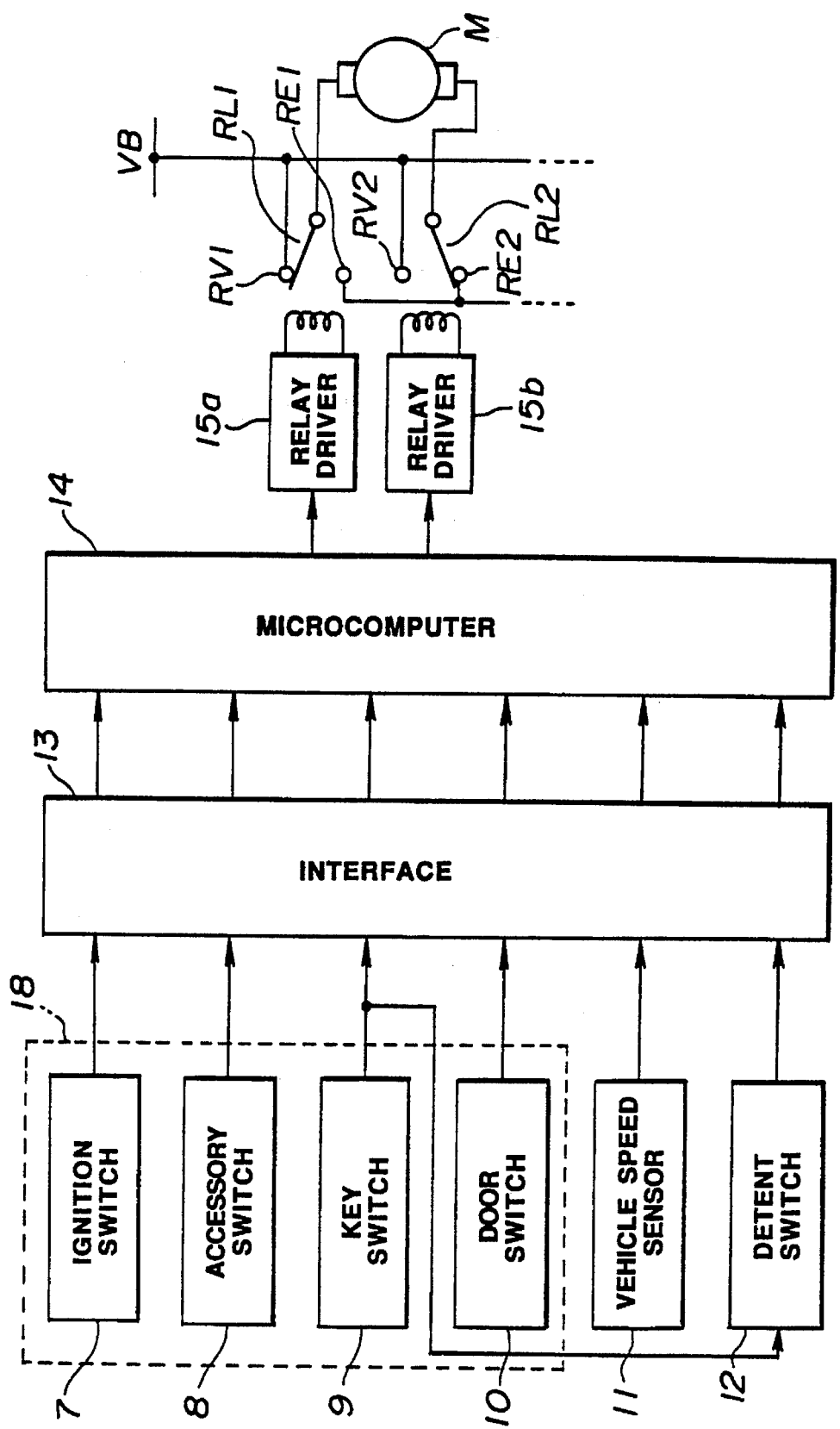
FIG. 2 is a block diagram showing one control system according to the first embodiment.
Figure 8:
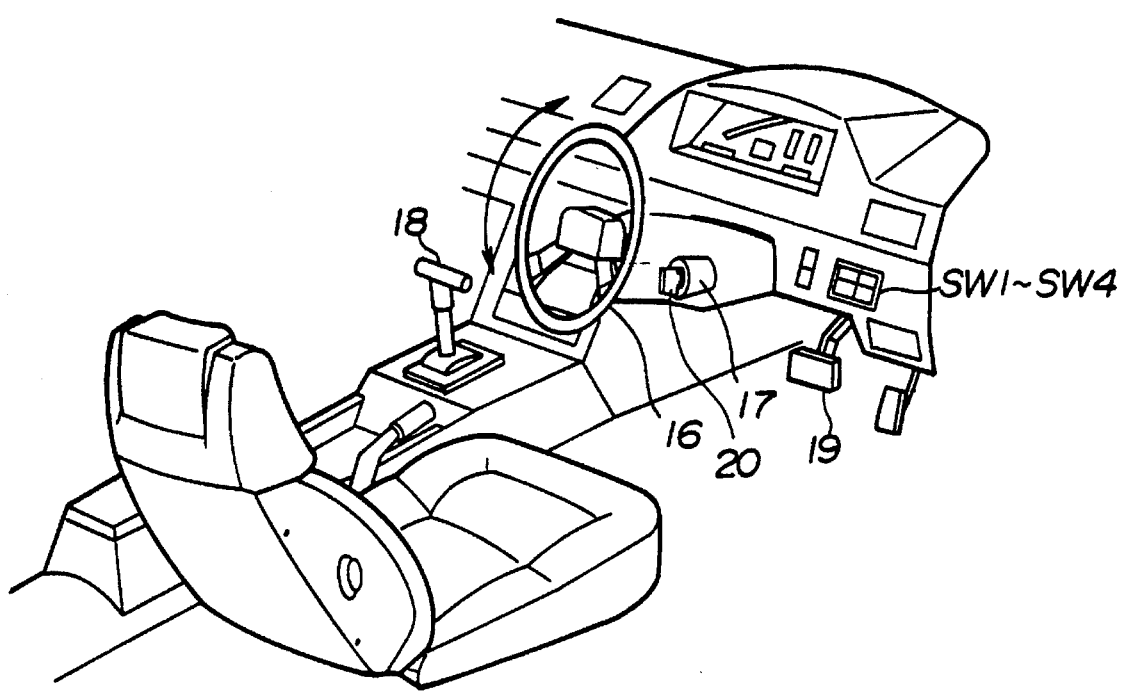
FIG. 8 is a schematic perspective view showing a driver's space within a vehicle, employed in the examples of FIG. 2 and FIG. 5.

FIG. 2 shows one practical example of the first embodiment of the present invention. A system shown in FIG. 2 is a steering wheel position (or posture) control system for a vehicle such as an automobile. As shown in FIG. 8, the vehicle of this example has a steering wheel 16, a vehicle main switch 17, a shift lever 18, a brake pedal 19, and a combination of manual switches SW1–SW4 which allows the driver to set a normal driving position of the steering wheel 16.

This control system includes an ignition switch 7, an accessory switch 8, a key switch 9, a door switch 10, a vehicle speed sensor 11 and a detent switch 12. In this example, these components 7–12 are used as sensors or sensing means for supplying input data.

The ignition switch 7 is an electric switch for switching on and off an engine control electric circuit for a prime mover of the vehicle. In this example, the prime mover includes an engine such as an internal combustion engine, and the engine control circuit is an ignition system (or circuit) for the engine of the vehicle. The ignition switch 7 has an on state for turning on the ignition system, and an off state for turning off the ignition system.

The accessory switch 8 is also an electric switch for switching on and off an accessory system (or accessory circuit) of the vehicle for additional vehicle safety, comfort and convenience. A radio or audio set is one of the most common convenience accessories of cars. The accessory switch 8 has an on state for turning on the accessory system, and an off state for turning off the accessory system. In this example, the ignition switch 7 and the accessory switch 8 are incorporated in the vehicle main switch 17 (shown in FIG. 8) which is a multiposition selector switch (or combination switch) operated with a vehicle key (or ignition key or engine key) 20 (shown in FIG. 8) by the driver of the vehicle, as in most of conventional cars. The main switch 17 has a key cylinder having a keyhole.

The key switch 9 is a device for detecting whether the key 20 is inserted in the keyhole or not. The key switch 9 is in one of on and off states when the vehicle key 20 is correctly in the keyhole of the vehicle main switch 17, and in the other state when the key 20 is not in the keyhole.

The door switch 10 is a device for sensing a condition of a door. The door switch 10 of this example is in one of on and off states when the door is open, and in the other state when the door is closed. The door monitored by the door switch 10 is a driver's door of the vehicle.

In the example of FIG. 2, these switches 7–10 constitute a group 18 which serves as the third sensing means 4 and which supplies input data required to detect driver's intention of getting off the vehicle or starting the vehicle, or to detect driver's operation for getting off the vehicle or starting the engine.

The vehicle speed sensor 11 corresponds to the vehicle speed sensing means 2 of FIG. 1.

The detent switch 12 is used as the park position sensing means 1 for sensing the condition of an automatic transmission of the vehicle. The detent switch 12 of this example is in an off state when the shift lever 18 (shown in FIG. 8) of the automatic transmission is in a park (or parking) position (usually indicated as P), and in an on state when the shift lever 18 is out of the park position. For example, the detent switch 12 is on when the shift lever 18 is in a reverse (R), neutral (N) or driving (D) position. The shift positions of P, R, N, D etc., are arranged in a shift pattern, as is well known. The detent switch 12 is operative when the key switch 9 is on.

The detent switch 12 is a component of a shift lock system which is known per se. For example, NISSAN *Shingatasha Kaisetsusho* (New Model Manual) G50-1, "NISSAN INFINITI Q45", C15~C19, published October 1989, discloses a shift lock system having a detent switch. The explanations and figures of this document about the shift lock system are herein incorporated by reference. As in the shift lock system of this document, the detent switch 12 shown in FIG. 2 is connected with a shift lock control unit (not shown in FIG. 2), which produces a shift lock signal to make the shift lever 18 immovable at the park position when the detent switch 12 is off (the shift lever 18 is in the park position), and releases the shift lock when a brake pedal 19 (shown in FIG. 8) is depressed. In the example of FIG. 2, the detent switch 12 is used for both the steering wheel position control and the shift lock.

The control system shown in FIG. 2 further includes an interface circuit 13 and a microcomputer 14 for serving as the is controlling means (3 and 5). The output signals of the switches 7–10 and 12, and the vehicle speed sensor 11 are all supplied to the microcomputer 14 through the interface circuit 13.

An electric motor M shown in FIG. 2 is a machine for converting electric power into mechanical power to tilt a steering wheel 16 (shown in FIG. 18) of the vehicle up and down. The motor M has a first motor terminal connected with a first relay RL1, and a second motor terminal connected with a second relay RL2. The microcomputer 14 is connected with each of a first relay driver circuit 15a and a second relay driver circuit 15b. The first relay driver circuit 15a receives a first command signal from the microcomputer 14, and operates the first relay RL1 to connect the first motor terminal of the motor M with either of a first ground terminal RE1 which is grounded and a first supply terminal RV1 which is connected with a power source VB such as a vehicle battery. Similarly, the second relay driver circuit 15b operates the second relay RL2 in response to a second command signal produced by the microcomputer 14, to connect the second motor terminal with either of a second ground terminal RE2 which is grounded, and a second supply terminal RV2 which is connected with the power source VB.

Figure 3:
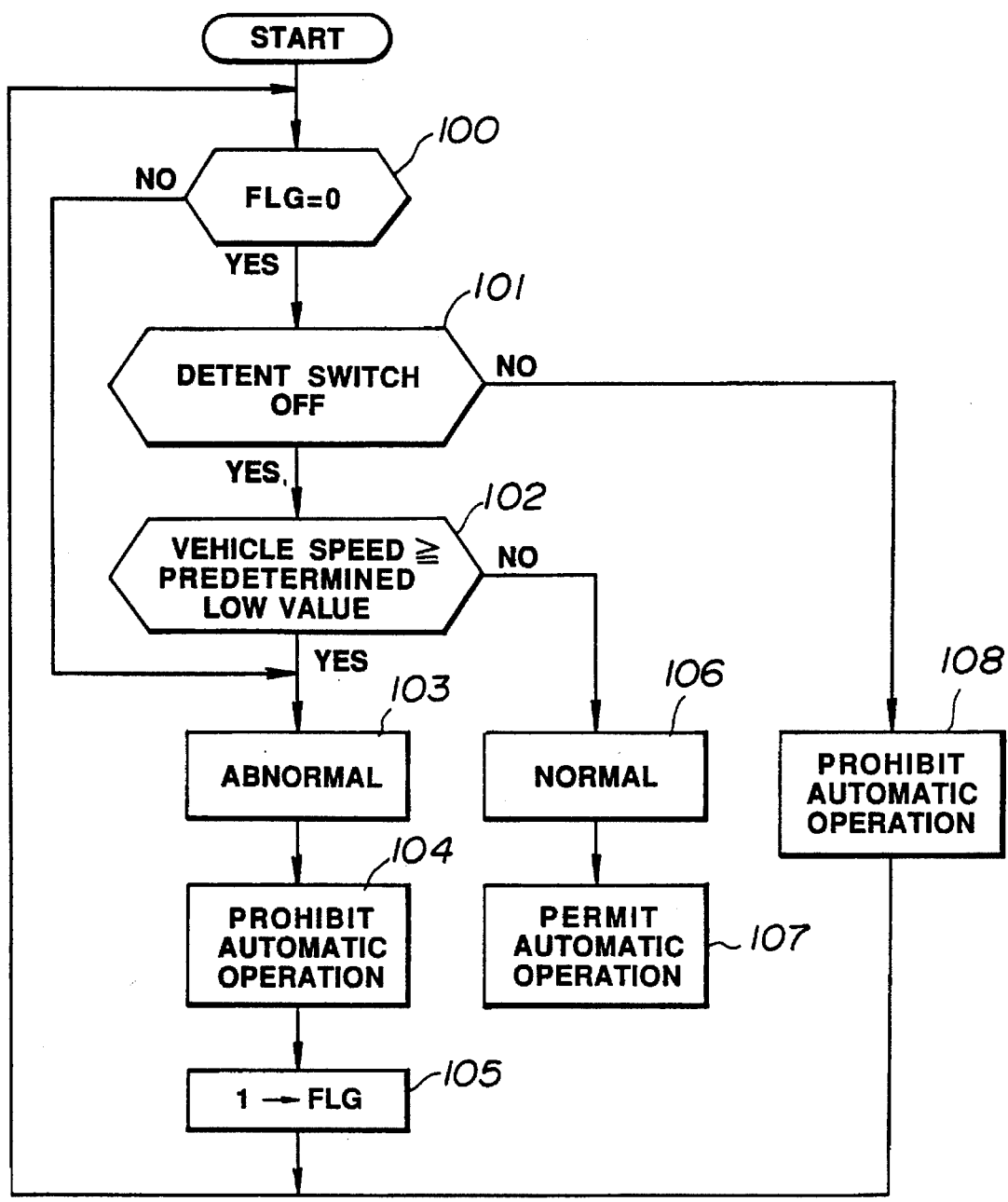
FIG. 3 is a flow chart showing a control program performed by the control system shown in FIG. 2.

FIG. 3 shows a control program performed by the microcomputer 14 shown in FIG. 2.

At a step 100, the microcomputer 14 (or a CPU of the microcomputer) determines whether a flag FLG is zero or not. The flag FLG is set equal to zero at an initial state. If the flag FLG is equal to zero, then the microcomputer 14 proceeds from the step 100 to a step 101.

At the step 101, the microcomputer 14 determines whether the detent switch 12 in the off state or not. If the shift lever 18 is out of the park position, and hence the detent switch 12 is on, then the microcomputer 14 proceeds to a step 108.

At the step 108, the microcomputer 14 prohibits the automatic operations to tilt the steering wheel 16 up and down. In this prohibitive state, the steering wheel 16 and the steering column are not tilted up or down automatically. From the step 108, the microcomputer 14 returns to the step 100.

A step 102 is reached if the shift lever 18 is in the park position and hence the detent switch 12 is off. At the step 102, the microcomputer 14 determines whether the vehicle speed sensed by the vehicle speed sensor 11 is equal to or higher than a predetermined speed value, 10 km/h, for example. When the vehicle speed is lower than the predetermined speed value, then the microcomputer 14 proceeds from the step 102 to a step 106, at which the microcomputer 14 judges the detent switch 12 and the vehicle speed sensor 11 to be normal. From the step 106, the microcomputer 14 proceeds to a step 107 to permit the automatic operations of the steering wheel 16 and the steering column. In this permissive state, the steering wheel 16 is automatically tilted up or down if the driver performs one of predetermined operations shown in FIG. 7.

When the vehicle speed is equal to or higher than the predetermined speed value (10 km/h, for example), the microcomputer 14 proceeds from the step 102 to a step 103, and judges that the detent switch 12 or the vehicle speed sensor 11 fails. From the step 103, the microcomputer 14 proceeds to a step 104 and prohibits the automatic tilting operations of the steering wheel 16. Then, the microcomputer 14 sets the flag FLG equal to one at a step 105, and returns to the step 100. Once either (or both) of the detent switch 12 and the vehicle speed sensor 11 is considered to be in an abnormal condition, the loop of the steps 100→103→104→105→100 is repeated and the steering wheel 16 is not moved automatically. If the vehicle speed sensor 11 and the detent switch 12 are restored to the normal state, the flag FLG is reset to zero to enable the microcomputer 14 to enter the step 101.

An automatic withdrawal command signal is delivered from the microcomputer 14 to the first relay driver circuit 15a if one of three automatic withdrawal conditions 1, 2 and 3 listed in FIG. 7 is satisfied. In response to the automatic withdrawal command signal of the microcomputer 14, the driver circuit 15a causes the first relay RL1 to move its movable element to the supply terminal RV1 as shown in FIG. 2. Therefore, the motor M causes the steering wheel 16 to move upward. When the steering wheel 16 reaches a predetermined withdrawal position, the relay RL1 is set to the state to connect the first terminal of the motor M to the ground terminal RE1, and the motor M is brought to a stop.

An automatic return command signal is delivered from the microcomputer 14 to the second relay driver circuit 15b if one of three automatic return conditions listed in FIG. 7 is satisfied. In response to this return command signal, the second relay driver circuit 15b causes the second relay RL2 to connect the second terminal of the motor M with the power source VB through the supply terminal RV2. Therefore, the motor M moves the steering wheel 16 downward. When the steering wheel 16 reaches a preset normal driving position, the second relay RL2 is set to the state to connect the second motor terminal with the ground terminal RE2, and the motor M is deenergized.

The thus-constructed control system of FIG. 2 permits the automatic withdrawal and automatic return of the steering wheel 16 only when the detent switch 12 is off and the vehicle speed is lower than the predetermined low speed, and prohibits the automatic withdrawal and return if the detent switch 12 is off but the vehicle speed is equal to or higher than the predetermined speed. Therefore, even if the detent switch 12 is put to the off state by some failure during movement of the vehicle, the control system of FIG. 2 correctly recognizes the movement of the vehicle by monitoring the vehicle speed, and prohibits the automatic movement of the steering wheel 16. The control system is reliable and sure to prevent the automatic movement of the steering wheel 16 while the vehicle is moving.

Figure 4:
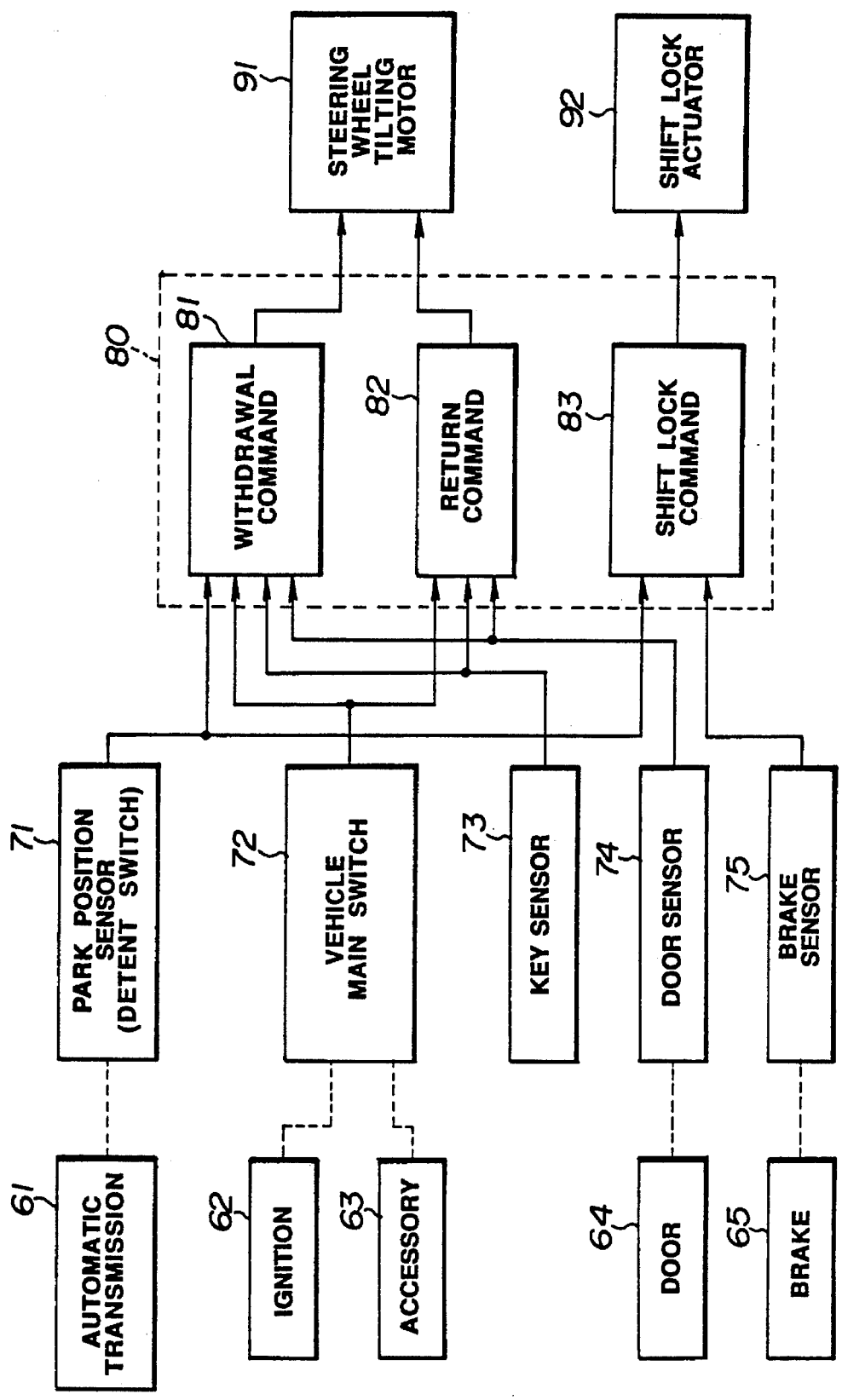
FIG. 4 is a block diagram showing a second embodiment of the present invention.

A second embodiment of the present invention is shown in FIG. 4. All the components shown in FIG. 4 are components of a vehicle. Like the vehicle of the first embodiment, the vehicle of the second embodiment includes a steering system including a steering column and a steering wheel 16 mounted on the top of the steering column, an automatic transmission system 61 including an automatic transmission and a shift lever 16 (as shown in FIG. 8), an electric circuit 62, such as an ignition circuit, for a prime mover of the vehicle, an accessory circuit 63, a vehicle body having at least a driver's door 64, and a brake system 65 including a brake pedal 19.

The vehicle further includes a park position sensor 71, such as the detent switch 12, for sensing a condition of the automatic transmission 61, a vehicle main switch 72 for turning on and off the ignition circuit 62 and the accessory circuit 63, a key sensor 73, a door sensor 74 for sensing a condition of the driver's door 64 and a brake sensor 75 for sensing a condition of the brake system 65. The park position sensor 71 is used as a means for determining whether the vehicle is at a stop.

A control unit 80 is connected with the components 71–75 to receive signals therefrom. The control unit 80 may include a withdrawal command signal generating section (or means) 81, a return command signal generating section (or means) 82, and a shift lock command signal generating section (or means) 83. The shift lock command section 83 may be separate from the remaining part of the control unit 80. For example, it is possible to use one microcomputer as the withdrawal command and return command sections 81 and 82, and another microcomputer as the shift lock command section 83.

A steering wheel tilting motor system 91 includes a motor for causing the steering wheel 16 of the vehicle up and down, and a motor control circuit. A shift lock actuator 92 makes the shift lever 18 immovable from the park position when the shift lock command section 83 produces a shift lock command signal. The shift lock actuator 92 may comprise a shift lock solenoid as disclosed in the above-mentioned "NISSAN INFINITI Q45". The shift lock command section 83 produces the shift lock command signal when the shift lever 18 of the automatic transmission 61 in the park position. When the vehicle mains switch 72 is in an "IGN" position and the brake pedal 19 is depressed, the shift lock command section 83 produces a shift release signal to permit movement of the shift lever 18 away from the park position, as disclosed in the above-mentioned "NISSAN INFINITI Q45". The second embodiment is further explained with reference to FIGS. 5 and 6.

Figure 5:
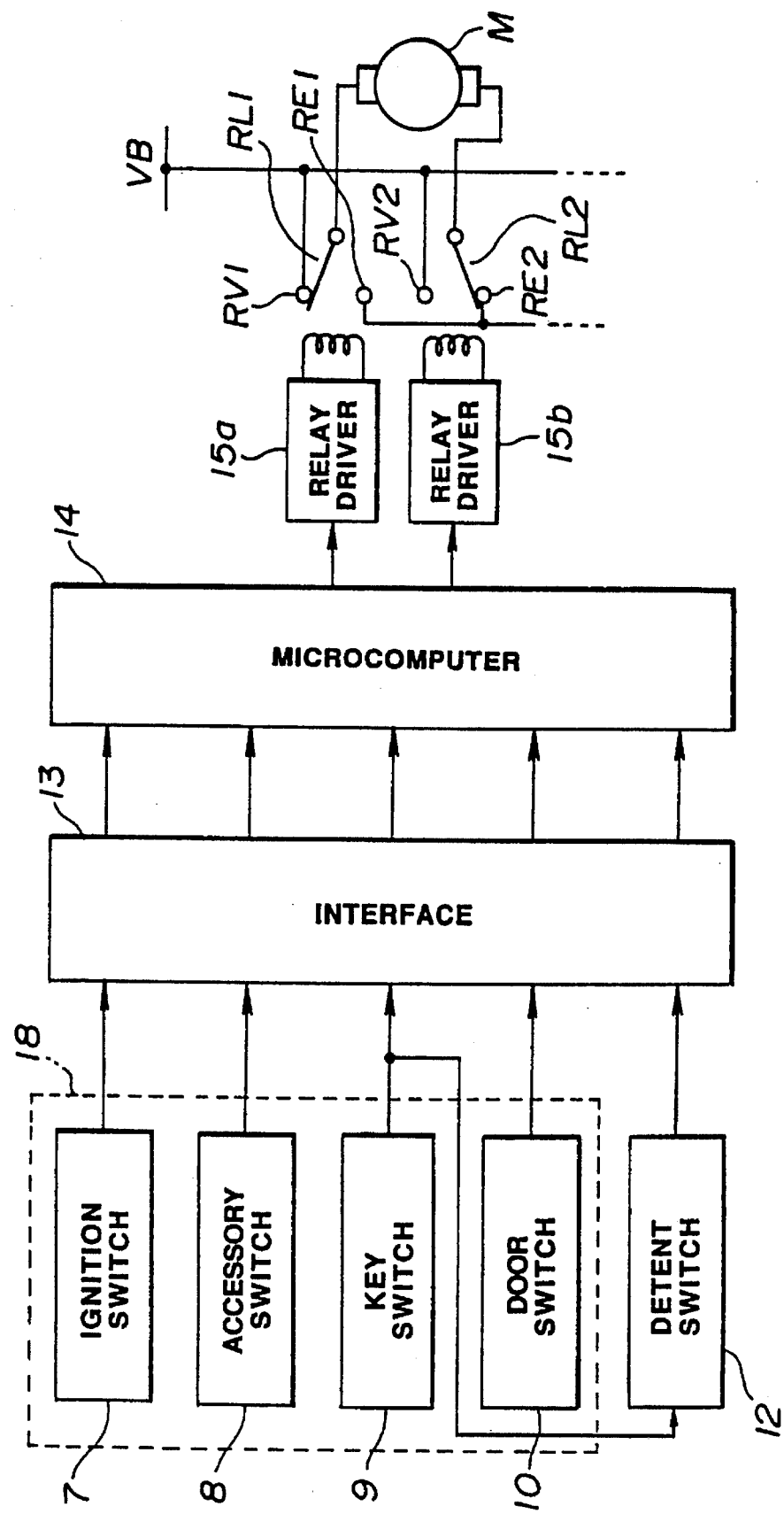
FIG. 5 is a block diagram showing one control system according to the second embodiment of the invention.

FIG. 5 shows one practical example of the second embodiment of the present invention.

The control system shown in FIG. 5 is similar to the control system of FIG. 2, and includes all the components (7–10 12–14, 15a, 15b, RL1, RL2, M and VB) shown in FIG. 2, except the vehicle speed sensor 11. The components of FIG. 5 are interconnected in the same manner as in FIG. 2. In the example of FIG. 5, the detent switch 12 corresponds to the park position sensor 71, the key switch 9 corresponds to the key sensor 73, and the door switch 10 corresponds to the door sensor 74. The ignition switch 7 and the accessory switch 8 are components of the vehicle main switch 72. The vehicle main switch 72 of this example takes the form of the switch 17 operated with the key 20.

Figure 6:
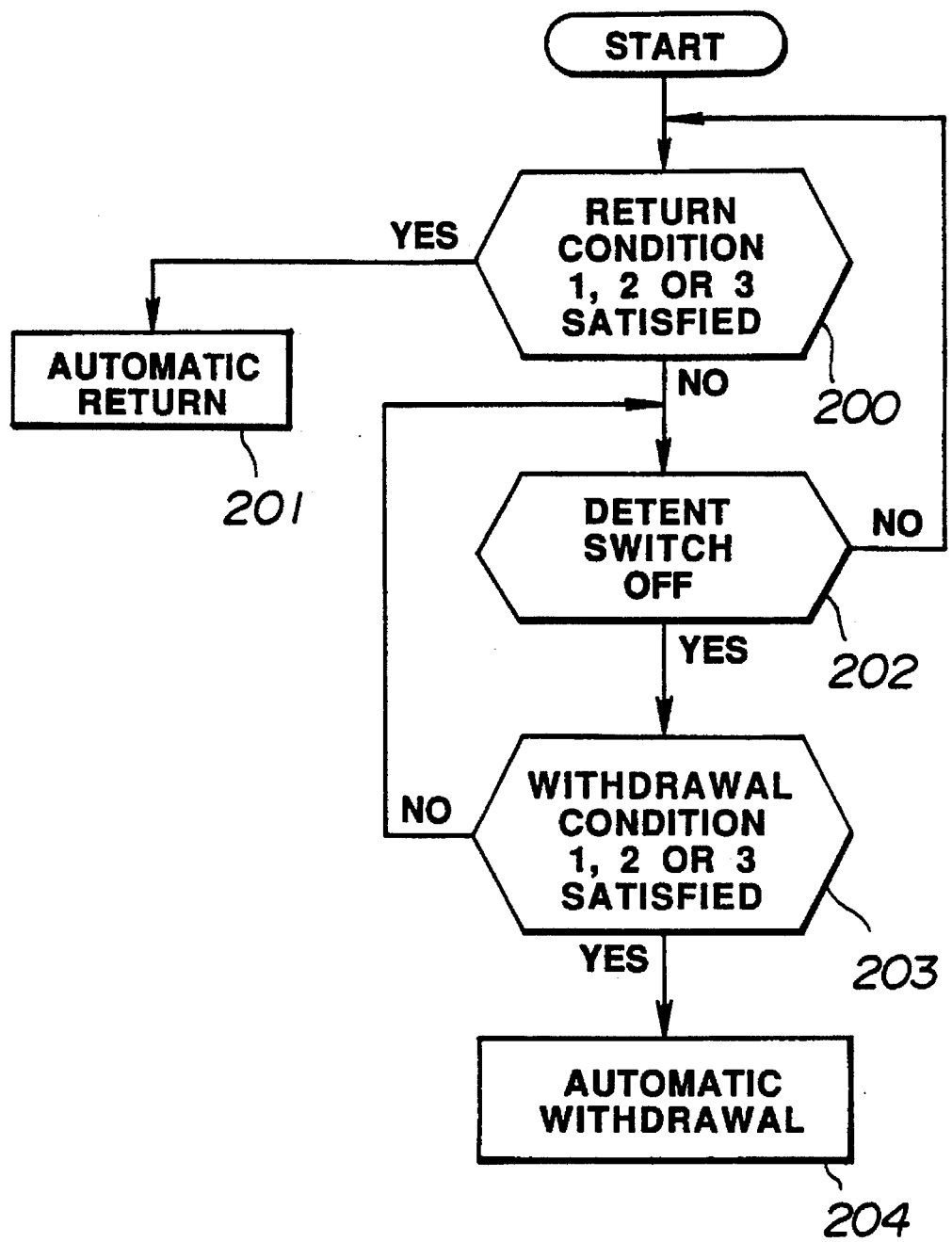
FIG. 6 is a flow chart showing a control program performed by the control system of FIG. 5.

FIG. 6 shows a control program performed by the microcomputer 14 of FIG. 5.

At a step 200, the microcomputer 14 determines whether at least one of three automatic return conditions listed in FIG. 7 is satisfied or not. If it is, the microcomputer 14 proceeds from the step 200 to a step 201, and performs an operation to automatically return the steering wheel 16 to the preset normal driving position. In the example of FIG. 5, as in the example of FIG. 2, the microcomputer 14 delivers the automatic return command signal to the second relay driver circuit 15b to connect the second motor terminal of the motor M with the supply. terminal RV2. Therefore, the motor M is driven to cause the steering wheel 16 to swing downward until the normal driving position is reached and the relay RL2 is switched to the ground terminal RE2.

If none of the automatic return conditions is satisfied, then the microcomputer 14 proceeds from the step 200 to a step 202, and determines, at the step 202, whether the detent switch 12 is in the off state or not. If the detent switch 12 is not in the off state, the microcomputer 14 returns from the step 202 to the step 200. If the detent switch 12 is off, then the microcomputer 14 proceeds to a step 203, at which it is determined whether at least one of three automatic withdrawal conditions listed in FIG. 7 is satisfied or not. If none of the withdrawal conditions is satisfied, the microcomputer 14 returns from the step 203 to the step 202. If any one or more of the three automatic withdrawal conditions is satisfied, the microcomputer 14 proceeds to a step 204 to perform an operation to automatically withdraw the steering wheel 16. In this case, the microcomputer 14 delivers the automatic withdrawal command signal to the first relay driver circuit 15a as in the first embodiment, and drives the motor M by connecting the first motor terminal with the supply terminal RV1 of the first relay RL1. When the steering wheel 16 is swung to the withdrawal position, the first terminal of the motor M is disconnected from the supply terminal RV1 and instead connected with the ground terminal RE1.

In the example of FIGS. 5 and 6, the automatic withdrawal command signal generating means 81 includes a means for storing instruction sets of the steps 202, 203 and 204, and executing the steps 202, 203 and 204, and the automatic return command signal generating means 82 includes a means for storing instruction sets of the steps 200 and 201 and performing the steps 200 and 201.

In the control program shown in FIG. 6, if one of the return conditions is satisfied, the microcomputer 14 proceeds to the step 201 to carry out the automatic return, without considering whether the detent switch 12 is off or not. In the vehicle of this example, the automatic withdrawal is not performed unless the shift lever 18 is put in the park position. Therefore, the shift lever 18 is in the park position when the steering wheel 16 is in the withdrawal position.

Furthermore, the driver cannot move the shift lever 18 from the park position to any of the other shift positions unless the vehicle key (or engine key) 20 is in the "IGN" position to turn on the ignition system, and at the same time the brake pedal 19 is depressed. Therefore, it is safe to consider the shift lever 18 to be in the park position if the steering wheel 16 is in the withdrawal position, and one of the automatic return conditions is satisfied. The control program of FIG. 6 is, therefore, arranged so that the step 201 for the automatic return can be reached without performing the decision step 202 to determine whether the shift lever 16 is in the park position or not. The practical example of FIGS. 5 and 6 is advantageous in that the control program is simplified.

When the detent switch 12 of the shift lock safety system is employed as the park position sensor 71 as in FIG. 5 (as well as in FIG. 2), it is not necessary to add a new sensor. This arrangement is advantageous in simplicity of the construction, weight of the system and manufacturing cost.

The control system of FIGS. 5 and 6 (as well as the control system of FIGS. 2 and 3) does not move the steering wheel 16 automatically to the withdrawal position unless the shift lever 18 is in the park position. Therefore, the steering wheel 16 is not moved against expectation of the driver. For example, the driver may pull up the car on an upward slope, stop the engine by turning the engine key to the LOCK position, and shift the shift lever to the neutral position to allow the vehicle to move down the slope by the gravitational force. In this case, the control system does not move the steering wheel 16 upward to the withdrawal position even if the driver opens the driver's door to see the distance between the rear of the car and an obstacle such as another car. If the step 202 were omitted from FIG. 6, the steering wheel 16 would be withdrawn in response to the opening of the driver's door, and the driver would be obliged to handle the steering wheel 16 in the awkward withdrawal position.

The control systems of the illustrated examples employ the conditions listed in FIG. 7. However, it is optional to employ different conditions. In the case of FIG. 7, the computer 14 monitors the output signals supplied from the vehicle main switch 17 including the ignition switch 7 and the accessory switch 8, the key switch 9 and the door switch 10. The computer 14 produces a first automatic withdrawal request signal if the key 20 is extracted from the keyhole of the vehicle switch 17, a second automatic withdrawal request signal if the driver's door is opened while the key 20 is at the "LOCK" position in the keyhole, a third automatic withdrawal request signal if the key 20 is turned from the "ACC" position to turn on the accessory system to the "LOCK" position while the driver's door is open, a first automatic return request signal if the key 20 is inserted into the keyhole, a second automatic return request signal if the driver's door is closed while the key 20 is at the "LOCK" position in the keyhole, and a third automatic return request signal if the key 20 is turned from the "ACC" position to the "IGN" position. The "LOCK", "ACC" and "IGN" positions are familiar to car drivers. In the example of FIG. 6, the microcomputer 14 produces the permission signal when the detent switch 12 is off. The automatic withdrawal command signal is produced if and only if the permission signal and at least one of the first, second and third automatic withdrawal request signals are present simultaneously.

What is claimed is:

1. A control system for changing a position of a steering wheel of a vehicle, said control system comprising:

a drive means for changing a position of the steering wheel of the vehicle in response to a command signal;

a sensing means for sensing a vehicle speed of the vehicle, and a condition of an automatic transmission of the vehicle; and a controlling means for commanding said drive means to change the position of said steering wheel by producing said command signal to make it easy for a driver of said vehicle to get on and off said vehicle, said controlling means delivering said command signal only when said vehicle speed is equal to or lower than a predetermined speed value, and simultaneously said automatic transmission is in a parking state.

2. A control system according to claim 1 wherein said sensing means comprises a park position sensing means for sensing a position of a shift lever of said automatic transmission and producing a signal when said shift lever is in a park position, a vehicle speed sensing means for sensing said vehicle speed, and a third sensing means for determining whether a predetermined condition indicative of a driver's intention of getting off said vehicle is satisfied or not, and wherein said controlling means comprising a judging means for producing a permission signal to permit automatic movement of the steering wheel only when said shift lever is in said park position and at the same time said vehicle speed is equal to or lower than said predetermined speed value, and a command signal generating means for producing said command signal to move said steering wheel to facilitate driver's ingress and egress into and out of the vehicle when said permission signal is present and at the same time said predetermined condition is satisfied.

3. A control system according to claim 2 wherein said park position sensing means comprises a detent switch which is in a first switch position when said shift lever is in said park position, and in a second switch position when said shift lever is out of said park position.

4. A control system according to claim 1 wherein said sensing means comprises a vehicle speed sensor for sensing said vehicle speed, a transmission position sensor for sensing a position of a movable element of said automatic transmission, and a third sensor for sensing a condition of a first operable member of the vehicle which is operated by a driver of the vehicle, and wherein said controlling means comprises a control unit for producing a first requirement signal when said vehicle speed is equal to or lower than said predetermined speed value, and a second requirement signal when said movable element of said automatic transmission is in a position for parking said vehicle, for further producing a third requirement signal in accordance with a signal supplied from said third sensor, and for further producing said command signal only when said first, second and third requirement signals are all present simultaneously.

5. A control system according to claim 4 wherein said third sensor senses the condition of said first operable member which is one of a driver's door of the vehicle, and a vehicle main switch for switching on and off an electrical system for a prime mover of said vehicle, and said controlling means includes a means for producing said third requirement signal indicative of a driver's intention of getting off said vehicle when said operable member is operated by the driver to get off the vehicle, a fourth requirement signal indicative of a driver's intention of starting said vehicle from a parking state, an automatic withdrawal command signal to command said drive means to move said steering wheel from a normal driving position to a withdrawal position when said first, second and third requirement signal are all present simultaneously, and an automatic return command signal to command said drive means to return said steering wheel from said withdrawal position to said normal driving position when said first, second and fourth requirement signals are all present simultaneously.

6. A control system according to claim 5 wherein said transmission position sensor comprises a detent switch which is put in a first switch position when a shift lever of said automatic transmission is in a park position, and in a second switch position when said shift lever is out of said park position.

7. A control system according to claim 6 wherein said control system further comprises a shift lock system for preventing movement of said shift lever of said automatic transmission when said detent switch is in said first switch position and a brake pedal of said vehicle is not depressed, and permitting movement of said shift lever away from said park position when said brake pedal is depressed.

8. A control system for changing a position of a steering wheel of a vehicle, said control system comprising:
   a detent switch which is in a first switch position when a shift lever of an automatic transmission is in a park position and in a second switch position when said shift lever is out of said parking position;
   a shift lock system which, if said detent switch is in said first switch position, permits movement of said shift lever away from said park position when an ignition switch of said vehicle is turned on and a brake pedal of said vehicle is depressed; and
   a drive means for changing a position of said steering wheel of said vehicle from a normal driving position to a withdrawal position in response to a withdrawal command signal; and
   a controlling means for causing said drive means to move said steering wheel from said normal position to said withdrawal position to facilitate driver's egress from said vehicle by producing said withdrawal command signal when said detent switch is in said first switch position.

9. A control system according to claim 8 wherein said detent switch is turned off in said first switch position, and turned on in said second switch position.

10. A vehicle comprising:
    a steering wheel;
    an automatic transmission system comprising an automatic transmission and a manual shift lever;
    a brake system comprising a brake pedal;
    a first signal generating component for producing a park position signal when said shift lever is in a park position;
    a second signal generating component for producing a brake signal when said brake pedal is depressed;
    a tilt motor system for moving said steering wheel to facilitate movement of a driver of said vehicle when the driver gets off said vehicle, said tilt motor system comprising a tilt motor for moving said steering wheel and a motor control circuit for driving said motor to move said steering wheel to a withdrawal position in response to an automatic withdrawal command signal;
    a shift lock actuator for making said shift lever immovable at said park position in response to a shift lock actuation signal; and
    a control unit which is connected with said first and second signal generating components, which produces said shift lock actuation signal when said brake signal and said park position signal are present; and which produces said automatic withdrawal command signal when said park position signal is present, and prevents said automatic withdrawal command signal from being delivered to said motor control circuit to prohibit said steering wheel from being automatically moved when said park signal is absent.

11. A vehicle according to claim 10 wherein said vehicle further includes an engine system comprising an engine and an engine control electric circuit including an ignition circuit for starting and stopping said engine, and a vehicle switch unit which is operated by the driver of said vehicle to switch on and off said engine control electric circuit, and which is put in a lock state for preventing operation of said engine system and an unlock state for permitting operation of said engine system, and wherein said control unit is connected with said vehicle switch unit, said control unit producing an automatic withdraw request signal when said vehicle switch unit is brought from said unlock state to said lock state, further producing a permission signal only when said park position signal is present, and further producing said automatic withdraw command signal in response to said automatic withdrawal request signal only when said permission signal is present.

12. A vehicle according to claim 11 wherein said first signal generating component is a detent switch which is in a first switch state when said shift lever is in said park position, and in a second switch state when said shift lever is out of said park position.

13. A vehicle according to claim 12 wherein said control unit comprises an AND logic operator for producing said permission signal only when said detent switch is in said first switch state, and simultaneously said vehicle speed is lower than said predetermined speed value.

14. A vehicle according to claim 11 wherein said vehicle further comprises a vehicle speed sensor for sensing a vehicle speed of said vehicle, and said control unit produces said permission signal only when said park position signal is present and simultaneously said vehicle speed is equal to or lower than a predetermined speed value.

15. A vehicle according to claim 14 wherein said control unit comprises a microcomputer.

16. A vehicle according to claim 11 wherein said control unit comprising a first means for producing an automatic return command signal to command said tilt motor system to move said steering wheel from said withdrawal position to a preset normal driving position without considering whether said park position signal is present or not, and a second means for determining whether said park signal is present or not, and producing said automatic withdrawal command signal only when said park signal is present.

17. A vehicle according to claim 16 wherein said vehicle further comprises a driver's door, a door position sensor for sensing a condition of said driver's door and for producing a door signal which is in a closed door indicative state when said door is closed and in an open door indicative state when said door is open, and a key sensor for sensing a condition of said vehicle switch which has a keyhole, and for producing a key signal which is in a presence indicative state when a key is inserted in said keyhole and in absence indicative state when said keyhole is unoccupied, said vehicle switch unit comprises a switch for producing a switch signal which is in an unlock indicative state when said vehicle switch unit is in said unlock state and in a lock indicative state when said vehicle switch unit is in said lock state, and said control unit comprises a computer for producing a first withdrawal request signal if said key signal changes from said presence indicative state to said absence indicative state, a second withdrawal request signal if said door signal changes from said closed door indicative state to said open door indicative state while said key signal is in said presence indicative state, a third withdrawal request signal if said switch signal changes from said unlock indicative state to said lock indicative state while said door signal is in said open door indicative state, a first return request signal if said key signal changes from said absence indicative state to said presence indicative state, a second return request signal if said door signal changes from said open door indicative state to said closed door indicative state while said key signal is in said presence state, a third return request signal if said vehicle switch is turned from a position to turn off said engine control electric circuit to a position for turning on said engine control electric circuit, a permission signal if said park position signal is present, and for further producing said automatic withdrawal command signal only when said permission signal is present and simultaneously at least one of said first, second and third withdrawal request signal is present, and said automatic return command signal when at least one of said first, second and third return request signal is present without regard to said permission signal.

18. A vehicle according to claim 11, wherein said vehicle further comprises a driver's door, a door position sensor for sensing a condition of said driver's door and a key sensor for sensing a condition of said vehicle switch unit which has a keyhole and producing a signal when a key is inserted in said keyhole, and said control unit is connected with said door position sensor and said key sensor, said control unit producing a second automatic withdrawal request signal when said door is opened while said key is in said keyhole, and producing said automatic withdrawal command signal in response to said second automatic request signal only when said permission signal is present.

19. A control system according to claim 1, wherein said sensing means comprises a door position sensor for sensing a condition of a door of said vehicle, and a key sensor for sensing a vehicle key inserted in a keyhole of a vehicle switch unit for turning on and off an engine system of said vehicle, and wherein said controlling means includes a means for producing a permission signal only when said vehicle speed is equal to or lower than said predetermined speed value and simultaneously said automatic transmission is in said parking state, commanding said drive means to change the position of said steering wheel by producing said command signal when said permission signal is present, and said door is opened while said key is in said keyhole of said vehicle switch unit, and prevent said command signal from being delivered to said drive means when said permission signal is absent.

* * * * *